US012632886B1

(12) United States Patent
Pedersen

(10) Patent No.: US 12,632,886 B1
(45) Date of Patent: May 19, 2026

(54) REAL-TIME SYNCHRONIZED MULTI-RETAILER CART

(71) Applicant: AdAdapted, Inc., Ann Arbor, MI (US)

(72) Inventor: Michael Pedersen, Ann Arbor, MI (US)

(73) Assignee: AdAdapted, Inc., Ann Arbor, MI (US)

( * ) Notice: Subject to any disclaimer, the term of this patent is extended or adjusted under 35 U.S.C. 154(b) by 0 days.

(21) Appl. No.: 19/067,739

(22) Filed: Feb. 28, 2025

Related U.S. Application Data

(63) Continuation of application No. 18/142,297, filed on May 2, 2023, now abandoned.

(60) Provisional application No. 63/378,838, filed on Oct. 7, 2022.

(51) Int. Cl.
G06Q 30/0601 (2023.01)
G06Q 30/0207 (2023.01)
G06Q 30/0251 (2023.01)

(52) U.S. Cl.
CPC ..... G06Q 30/0605 (2013.01); G06Q 30/0222 (2013.01); G06Q 30/0253 (2013.01); G06Q 30/0268 (2013.01); G06Q 30/0269 (2013.01); G06Q 30/0633 (2013.01); G06Q 30/0641 (2013.01)

(58) Field of Classification Search
CPC .......... G06Q 30/0207–02777; G06Q 30/0605; G06Q 30/0633; G06Q 30/0641
USPC ............................................. 705/14.1–14.73
See application file for complete search history.

(56) References Cited

U.S. PATENT DOCUMENTS

| | | | |
|---|---|---|---|
| 8,266,014 B1 * | 9/2012 | Bhosle | G06Q 30/0278 705/26.7 |
| 10,332,181 B1 * | 6/2019 | McAllister | G06F 16/24578 |
| 10,366,436 B1 * | 7/2019 | Kumar | G06Q 10/087 |
| 11,475,487 B1 | 10/2022 | Tipograph et al. | |
| 2010/0082447 A1 * | 4/2010 | Lin | G06Q 30/0601 705/26.1 |
| 2017/0148046 A1 | 5/2017 | Akbarpour Mashadi et al. | |
| 2019/0057433 A1 * | 2/2019 | Pedersen | G06Q 30/0633 |

(Continued)

OTHER PUBLICATIONS

H. Google, "How Google Shopping Works", retrieved from https://support.google.com/googleshopping/answer/9128904?hl=en, available on Jun. 17, 2021 (Year: 2021).*

(Continued)

*Primary Examiner* — Sam Refai
(74) *Attorney, Agent, or Firm* — Perkins Coie LLP; Michael A. Glenn

(57) ABSTRACT

A product offered by the advertisement is displayed to the consumer in a multi-retailer cart which allows the consumer to select the product from among a plurality of retailers identified in the multi-retailer cart that offer the same or similar products and the mobile. The plurality of retailers to be displayed in the multi-retailer cart is determined by application of any of several factors that include the current location of the consumer, where those retailers that are most proximate to the consumer are displayed; incentives that are uniquely available based on consumer location; profile information associated with the consumer, such as retail preferences, affinity memberships; retailer factors, such as the availability of discounts, coupons, availability of the product in inventory, etc. The retailers may be ranked in the cart based on any one or more of these factors, and/or based upon payment of a promotion fee.

12 Claims, 18 Drawing Sheets

(56)          References Cited

U.S. PATENT DOCUMENTS

| | | | |
|---|---|---|---|
| 2019/0362381 A1* | 11/2019 | Farshori | G06Q 30/0253 |
| 2020/0143485 A1* | 5/2020 | Systrom | G06Q 30/0269 |
| 2022/0230198 A1* | 7/2022 | Wolinsky | G06Q 30/0238 |
| 2023/0351469 A1* | 11/2023 | Yelukati | G06Q 30/0283 |

OTHER PUBLICATIONS

International Search Report and Written Opinion for PCT/US23/76140 mailed Nov. 16, 2023; 8 pages.

* cited by examiner

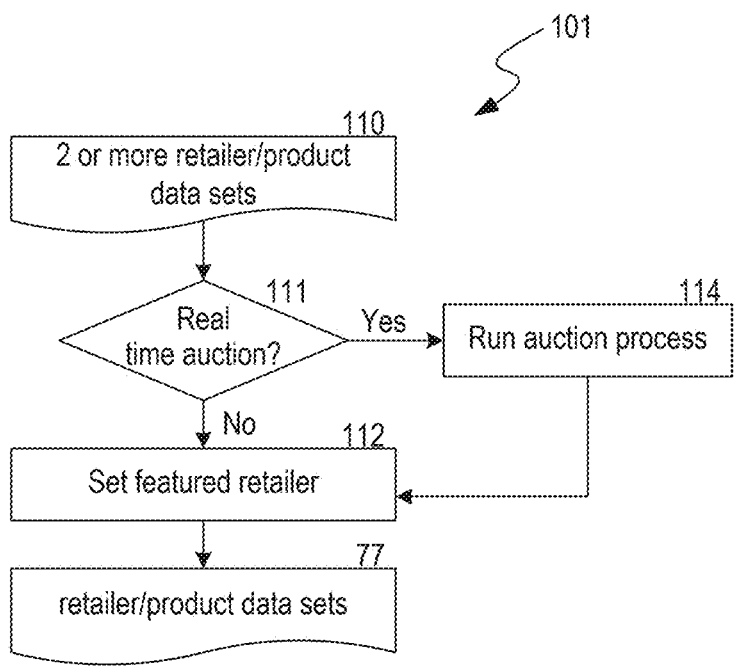
_FIG. 11_

REAL-TIME SYNCHRONIZED MULTI-RETAILER CART

CROSS REFERENCE TO RELATED APPLICATIONS

This Application is a continuation of U.S. application Ser. No. 18/142,297, filed 2 May 2023, which claims priority to U.S. Provisional Application No. 63/378,838, filed 7 Oct. 2022, each of which is incorporated by reference herein in its entirety.

FIELD

Various of the disclosed embodiments concern a multi-retailer cart.

BACKGROUND

Digital advertisements are often displayed within mobile applications or on mobile websites and often link to other mobile websites or HTML pages, such that when a consumer clicks on or otherwise selects the advertisement, that consumer is taken to a website other than the one they are browsing. This can be annoying to consumers, especially if they did not select the advertisement on purpose.

Digital Consumer Packaged Goods (CPG) companies, among others, sell products through brick-and-mortar stores. As such, there exists a need to find innovative ways to provide effective digital ads that are accepted by consumers and that lead to in-store/brick and mortar purchases.

Additionally, with the rise of new services such as curb-side pickup and grocery delivery services, consumer shopping habits have changed. Impulse purchases, which currently occur while a consumer walks through a store, do not occur when a consumer plans/executes their shopping trip from home, work, or some other location other than in the store and never physically enters the store.

U.S. Pat. No. 10,692,129, Systems and Methods for Generating and/or Modifying Electronic Shopping Lists from Digital Advertisements, issued Jun. 23, 2020, which is commonly owned by Adadapted Inc., the assignee of the subject application, and which is incorporated herein in its entirety by this reference thereto, discloses systems and methods for generating advertisements with Add-To-List capabilities to facilitate adding products to a shopping list for a consumer who views or otherwise selects an advertisement.

An item may be added to the shopping list upon the consumer selecting the advertisement, or the consumer may be provided the option to add the item while viewing the advertisement, not add the item, open the list to view which items have already been added, or add the item to the list at a later time, in which case one or more reminders may be manually or automatically be configured or a trigger event may be set which causes the item to be added to the list.

SUMMARY

Many advantages will be determined and are attained by one or more embodiments of the technology, which in a broad sense provides systems and methods for effecting a retailer transaction for a consumer who views or otherwise selects a digital advertisement and then selects the product from among a plurality of retailers identified in a multi-retailer cart that offer the same or similar products.

In one or more implementations of the technology, at least a portion of the method may be performed by a computing device that includes at least one processor. The method may include presenting an electronic advertisement associated with a product, for display on a digital device. The method also may include the digital device for receiving an input indicating a selection of the advertisement. A product offered by the advertisement is displayed to the consumer in a multi-retailer cart which allows the consumer to select the product from among a plurality of retailers identified in the multi-retailer cart that offers the same or similar products. Upon selection of a retailer, the device routes an application ("app") on the digital device to a retailer commerce site or transaction processor.

In one or more implementations of the technology, a system may include a mobile advertisement presentation module, stored in memory, that provides a mobile advertisement, that advertises a product, for display on a digital device. The system may also include an advertisement selection module, stored in memory, that detects when an advertisement has been selected for viewing.

A product offered by the advertisement is displayed to the consumer in a multi-retailer cart which allows the consumer to select the product from among a plurality of retailers identified in the multi-retailer cart that offer the same or similar products. The plurality of retailers to be displayed in the multi-retailer cart is determined by application of any of several factors that include the current location of the consumer, where those retailers that are most proximate to the consumer are displayed; incentives that are uniquely available based on consumer location; profile information associated with the consumer, such as retail preferences, affinity memberships; retailer factors, such as the availability of discounts, coupons, availability of the product in inventory, etc. The retailers may be ranked in the cart based on any one or more of these factors, and/or based upon payment of a promotion fee or pursuant to a bidding process that is similar to ad placement bidding.

Upon selection of a retailer, via a routing module, stored in memory, the consumer may be optionally presented with a message that routes a browser located on the device to a shopping list and/or a retailer order entry system. If the consumer chooses not to be routed to the entry system, the order is sent directly to the chosen retailer's order system for a purchase by the consumer at a later point in time. The retailer order entry system may also enter discounts, coupons, or other promotions associated with the selected product that are offered by the retailer and/or that are available to the consumer by virtue of the consumer's profile and/or affinity status with the retailer. Incentives that are uniquely available based on consumer location may also be captured even where the incentives for the advertised product are only available locally and not otherwise available nationally.

The retailer then fulfills the order. Fulfillment can occur via an on-line fulfillment mechanism, or the consumer can select the product from an advertisement while in a brick-and-mortar store and complete the order at a POS station within the store.

BRIEF DESCRIPTION OF THE DRAWINGS

FIG. 11 shows a featured retailer process according to an embodiment of the invention;

DETAILED DESCRIPTION

Figure 1:
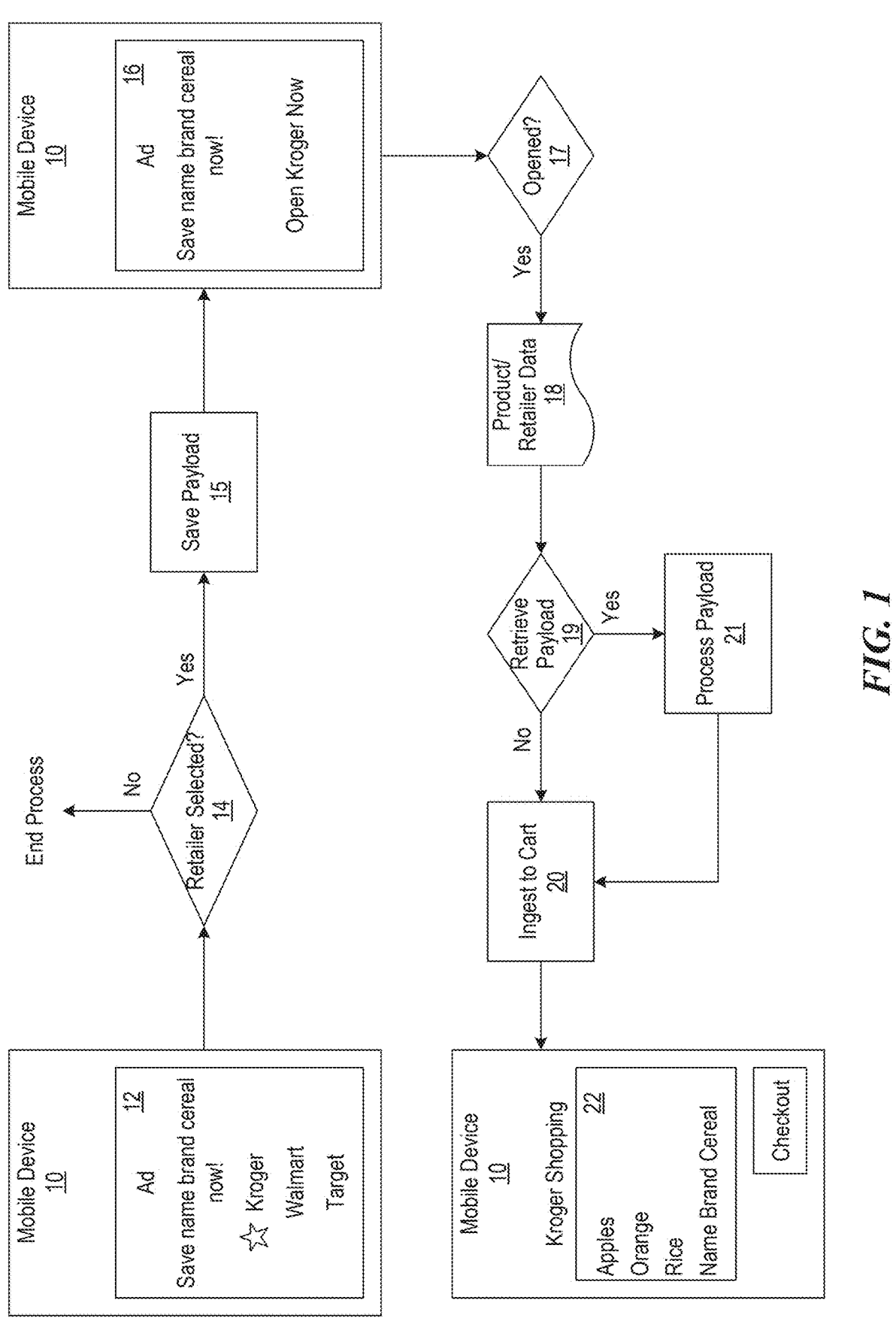
FIG. 1 illustrates a process for adding an item associated with an advertisement to a list according to an embodiment of the invention.

In one or more implementations of the technology, at least a portion of the method may be performed by a computing device that includes at least one processor and memory. The method may include presenting an electronic advertisement associated with a product, for display on any digital device, such as a mobile device, desktop computer, smart TV, etc. The method also may include the digital device for receiving an input indicating a selection of the advertisement. A product offered by the advertisement is displayed to the consumer in a multi-retailer cart which allows the consumer to select the product from among a plurality of retailers identified in the multi-retailer cart that offer the same or similar products and the mobile. Upon selection of a retailer, the device optionally routes an application ("app") on the digital device to a retailer commerce site or transaction processor.

In one or more implementations of the technology, a system may include a mobile advertisement presentation module, stored in memory, that provides a mobile advertisement, that advertises a product, for display on a digital device. The system may also include an advertisement selection module, stored in memory, that detects when an advertisement has been selected for viewing.

A product offered by the advertisement is displayed to the consumer in a multi-retailer cart which allows the consumer to select the product from among a plurality of retailers identified in the multi-retailer cart that offer the same or similar products. The plurality of retailers to be displayed in the multi-retailer cart is determined by application of any of several factors that include the current location of the consumer, where those retailers that are most proximate to the consumer are displayed; incentives that are uniquely available based on consumer location; profile information associated with the consumer, such as retail preferences, affinity memberships; retailer factors, such as the availability of discounts, coupons, availability of the product in inventory, etc. The retailers may be ranked in the cart based on any one or more of these factors, and/or based upon payment of a promotion fee.

Upon selection of a retailer, a routing module, stored in memory, routes a browser located on the digital device to a shopping list and/or to a retailer order entry system. The retailer order entry system may also enter discounts, coupons, or other promotions associated with the selected product that are offered by the retailer and/or that are available to the consumer by virtue of the consumer's profile and/or affinity status with the retailer. Incentives that are uniquely available based on consumer location may also be captured even where the incentives for the advertised product are only available locally and not otherwise available nationally.

The retailer then fulfills the order. In embodiments, fulfillment can occur via an on-line fulfillment mechanism. In other embodiments, the consumer can select the product from an advertisement while in a brick-and-mortar store and complete the order at a POS station within the store. In still other embodiments, the system receives POS data tied to the consumer and uses that data to enhance the ad targeting process.

A shopping list may then be configured to open when the consumer enters or comes within a defined proximity of an advertised store or enters or comes within a defined proximity of a store which carries the product or service or when the consumer manually selects to open the shopping list. The shopping list may be linked with a store map which provides the location of the product/service within the store and once the product/service is purchased, the product/service may automatically be removed from the list or it may need to be manually removed from the list.

For purposes of this disclosure "digital device" means a mobile phone, laptop computer, tablet computer, personal digital assistant ("PDA"), electronic reader ("e-reader"), mobile game console, smart watch, smart glasses, voice assistant devices, smart TV, or any other digital device which runs software applications ("apps") and transmits and/or receives data.

For purposes of this disclosure "remote" means accessible via network, telephone, email, text, video, website a combination of the same or any other form of communication wherein the parties need not be collocated to communicate.

For purposes of this disclosure "targeted advertisement" or "targeted advertising" means one or more digital advertisements directed to a consumer based on information known, learned, or estimated about a consumer and/or directed to the consumer with information that could be used to identify the consumer. The advertisement need not be targeted to fall within a scope of the technology, but it is preferably. Thus, the terms "targeted advertisement" or "targeted advertising" may include random or semi-random advertisements.

For purposes of this disclosure "item," "product," and/or "service" are used interchangeably herein and means anything that can be sold or purchased in a brick-and-mortar store and/or on-line through a store or distribution center.

For purposes of this disclosure "app" means a software application that can be run on a digital device. It may also include a web accessible application.

For purposes of this disclosure "Cloud," "Web," and/or "Internet" shall be used interchangeably herein and shall refer to the global wide area network referred to as the world wide web.

For purposes of this disclosure "advertising creative" means pictures, banner ads, social ads, video ads or other conventional types of digital advertisements.

In one or more embodiments, a consumer logs into an app on a digital device. Initially, a consumer downloads the app and sets up a profile in which the consumer enters his name, password, and any other conventional information that is usually entered for signing up for an app. Once the consumer signs up for the app, the consumer may be presented with a login screen. The decision whether to require a login is a design choice. The consumer may sign up for the app prior to viewing a participating advertisement or he may be provided with the opportunity to sign up when viewing a participating advertisement.

While logged in, a mobile advertisement may be displayed on the digital device. Through an application programming interface ("API"), one or more mobile shopping lists or retailer transaction processing systems may integrate technology directly into the app. The app may then be used on a consumer's digital device. An advertisement is presented to the consumer that includes links to two or more retailers who each offer the same or similar product as the product shown in the advertisement. When the consumer selects the advertisement, the consumer may be presented with an option to save the advertised product into a shopping list, e-commerce carts, baskets, etc., or to complete a transaction with a selected retailer.

The list could be an existing list or a new list. The advertisement may be for a single item or it may be for multiple items. For advertisements which include multiple items the consumer may be provided with a choice of which items to include in the shopping list. The list may be stored online, e.g. at a deep link URL, and/or at the digital device (either directly or it may be pushed to the digital device). The list may only include the item, or it may also include one or more stores that sell the item. If the shopping list is for a specific store, the list may automatically open on the digital device when the digital device comes within a defined proximity to the store. This may be done via geo-fencing, beacon technology, or some other location-based method. Optionally, the app may include a map of the store or a map of the store may be provided to the digital device, which may show the location of the items within the store. Upon checkout, the cashier may employ a merchant side app which sends information about the items purchased to the consumer side app so that items that were purchased may be automatically removed from the shopping list. In one or more embodiments, the consumer may be provided an option as to whether the item should be removed from the list or not.

FIG. 1 illustrates a state-of-the-art process for adding an item associated with an advertisement to a list. In FIG. 1, a consumer operates a mobile device 10 and an advertisement 12 may be displayed. The system determines if a retailer has been selected 14. If the consumer does not select the advertisement then the process ends. If the consumer selects the advertisement an associated payload is served 15 to the digital device 10 and the consumer may be provided the option to save the product listed in the advertisement 12. The consumer 10 may also be provided with the option 16 to open the app 17, assuming the app is not already open. If the consumer does not open the app the payload may be stored for a later time when the consumer opens the app. If the consumer opens the app, product and retailer information is retrieved 18. If the payload is retrieved 19, the payload is processed 21 and ingested to a multi-retailer shopping cart 20. If the payload is not retrieved, the product and retailer information is ingested to the multi-retailer shopping cart 20 and a shopping list 22 is displayed in the digital device.

Figure 2:
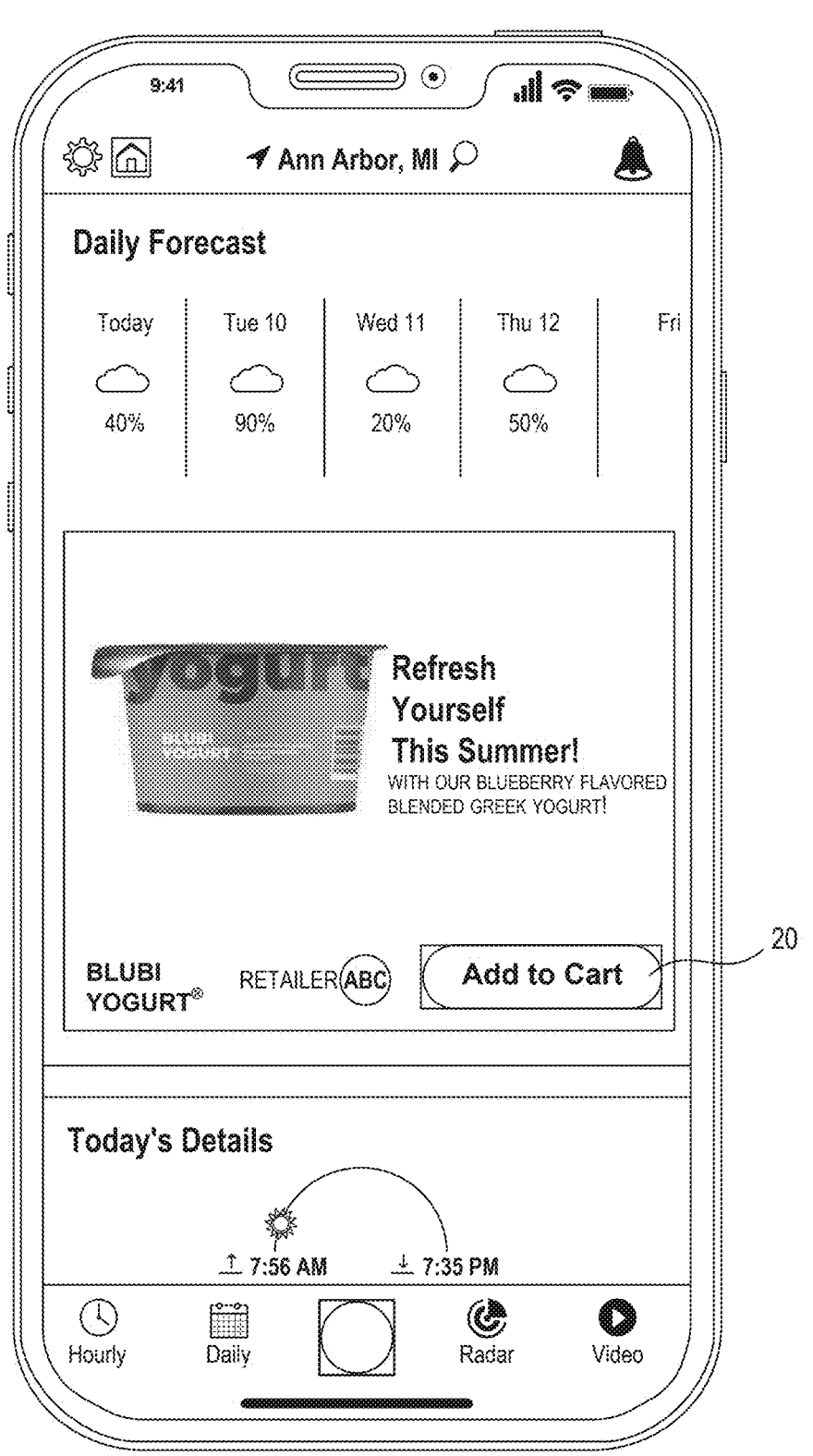
FIG. 2 illustrates presenting an electronic advertisement associated with a product, for display on a digital device.

FIG. 2 illustrates presenting an electronic advertisement associated with a product, for display on a digital device in accordance with the state-of-the-art system discussed in connection with FIG. 1. In this system an advertisement displayed on a consumer device include a button that allows the consumer to add the advertised item to a shopping list, as discussed above.

FIGS. 3A-3F illustrate presenting an electronic advertisement associated with a product, for display on various devices according to an embodiment of the invention. For example, the device may be any of a computer (FIGS. 3A, 3B), cell phone (FIG. 3C, 3D), or work pad (FIGS. 3E, 3F), among other devices.

In contrast to the state-of-the-art system shown in FIGS. 1 and 2, embodiments of the invention provide a list of retailers 30, e.g. ABC, Instacart, and Target, each of which has a shopping cart button. The system creates a list of retailers to associate with the advertisement based on any of several factors as discussed below. Significantly, the system must integrate disparate retailer UI's and API's to present a consistent user experience and functionality when assembling the list of retailers.

Figures 3A, 3B, 3C, 3D:
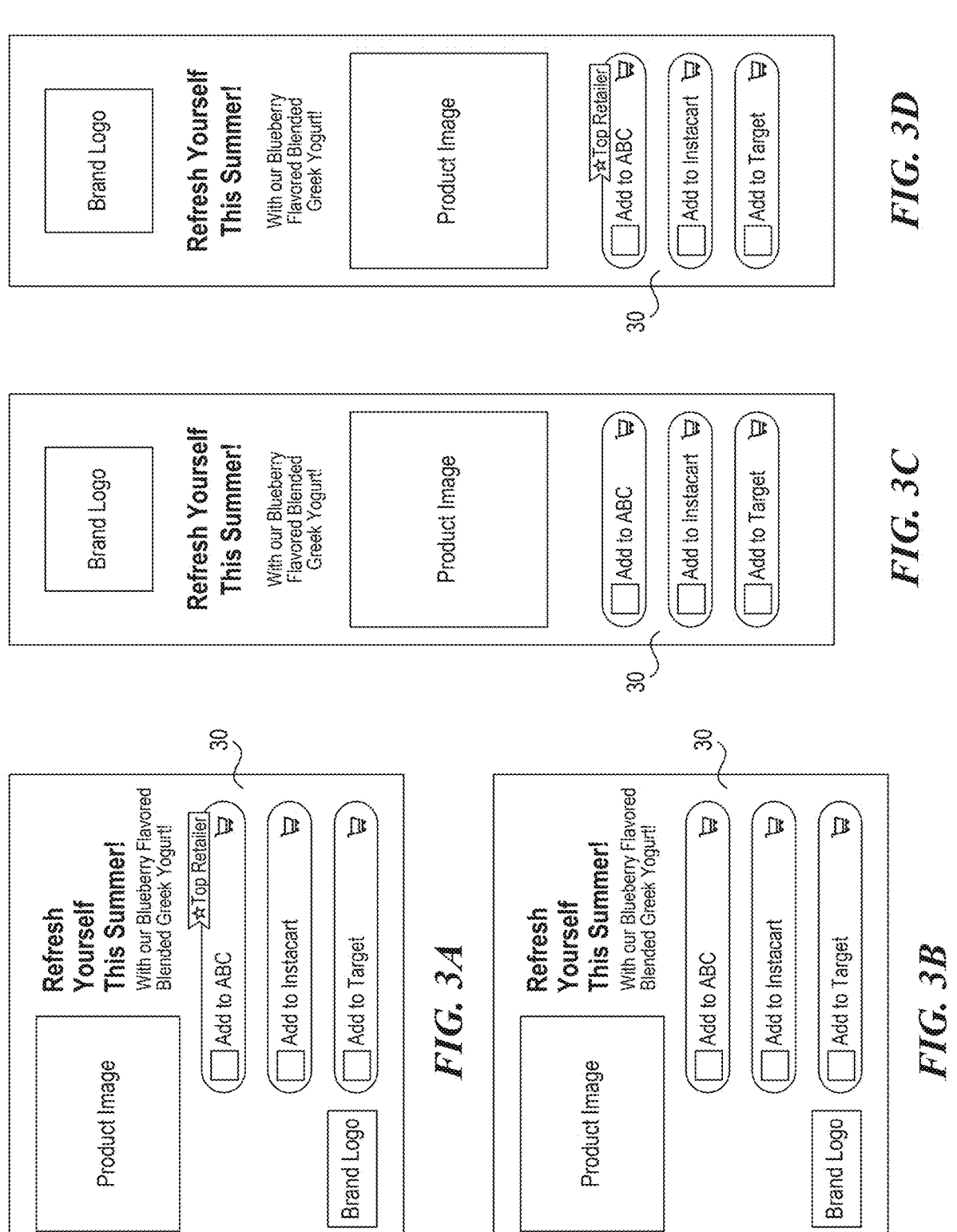
FIG. 3A-3F illustrate presenting an electronic advertisement associated with a product, for display on various devices according to an embodiment of the invention.
Figures 3E, 3F:
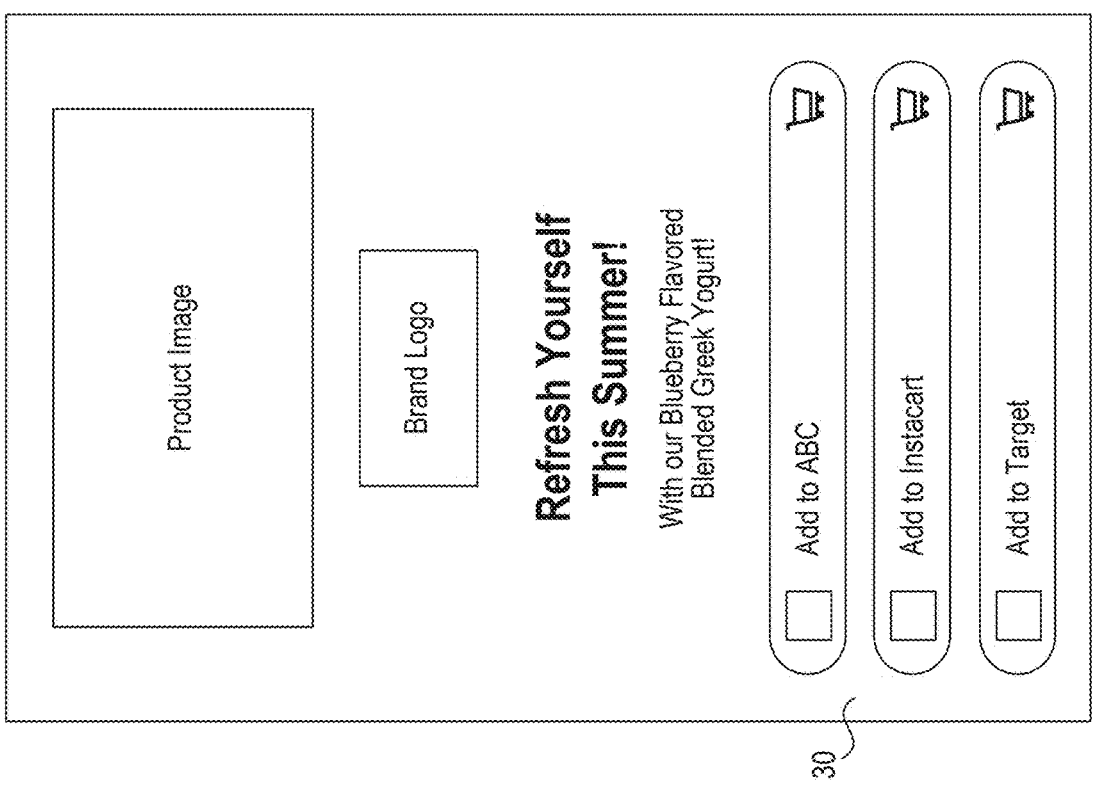

In embodiments of the invention, the retailer provides a list of all products available at each store every X hours (24 or 12). In some cases a highlighted "Top Retailer" is shown (FIGS. 3A, 3C, 3E). This data is stored and used a reference as discussed below in connection with FIG. 9.

In other embodiments of the invention, the system leverages an API provided by the retailer to check every X hours (24 or 12) and stores that data as discussed below in connection with FIG. 9.

In yet other embodiments of the invention, when a shopper is identified to target with an ad, an API call is made to a retailer in real time, which includes the location of the shopper. Inventory data is used at that point. This data set is then used as discussed below in connection with FIGS. 7 and 9.

Further, selection of a particular retailer should be consistent even though each retailer may maintain a different shopping cart and transaction processing system. For example, by retrieving and ingesting a payload; see U.S. Pat. No. 10,692,129, supra.

In some cases, the consumer must login to the retailer's transaction processing and fulfillment system, in other cases a single sign on approach may be applied once the consumer initially selects a retailer from the list of retailers associated with the advertisement. When the consumer selects a retailer, the advertised product is placed in a shopping cart for that retailer.

Figure 4:
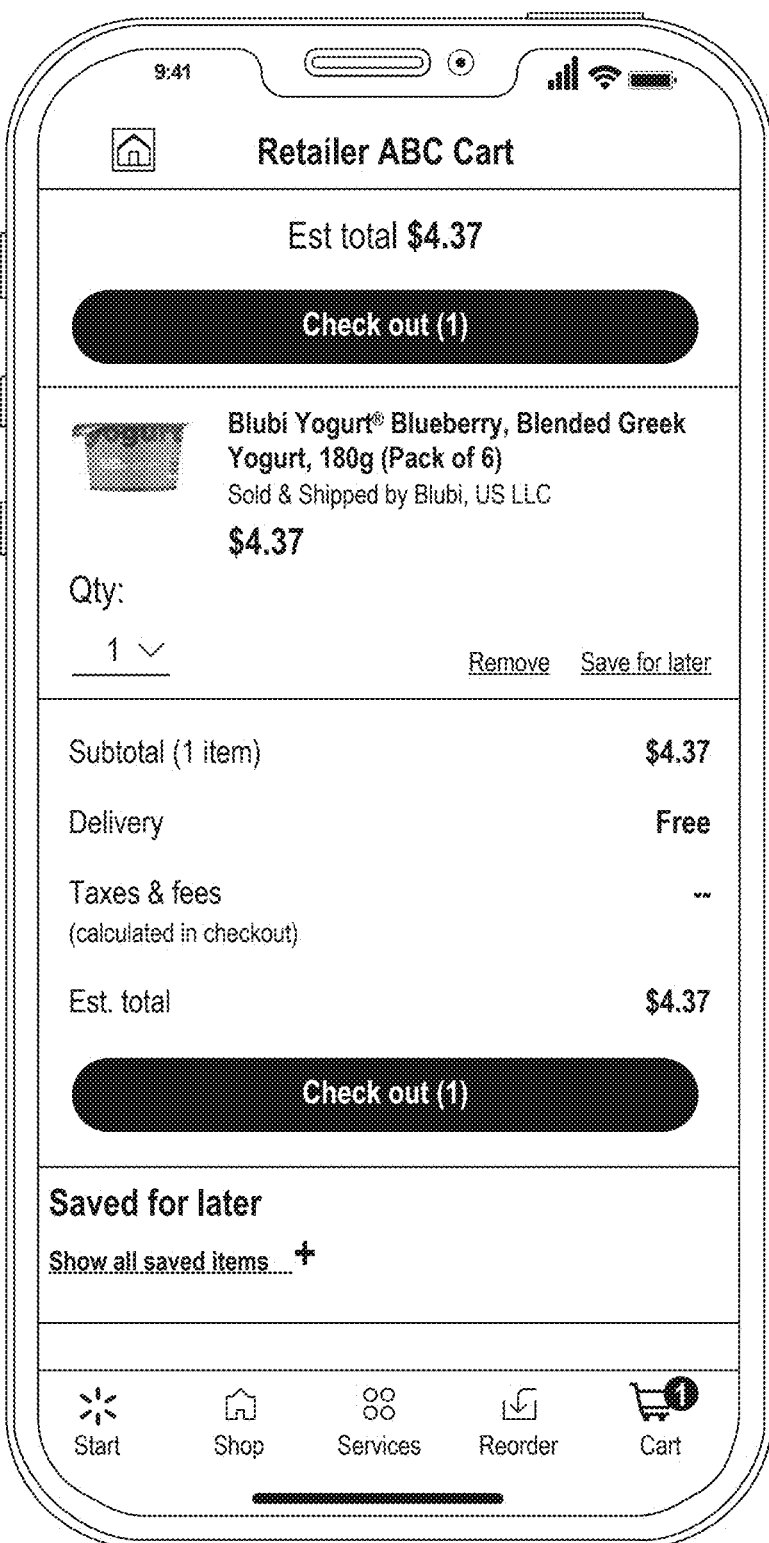
FIG. 4 illustrates a product order on a retailer order entry site, for display on a digital device according to an embodiment of the invention.

FIG. 4 illustrates a product order 40 in a shopping cart on a retailer order entry site, for display on a digital device according to an embodiment of the invention. More than one product may be added to the shopping cart in response to consumer selection of various advertisements, as well as consumer selection of products at the retailer website, in response to retailer solicitations, and in response to in-store selections by the consumer, for example by scanning QR codes or the like. When the consumer is ready to complete the transaction, the consumer checks out the products on the shopping cart.

Figures 5A, 5B, 5C, 5D:
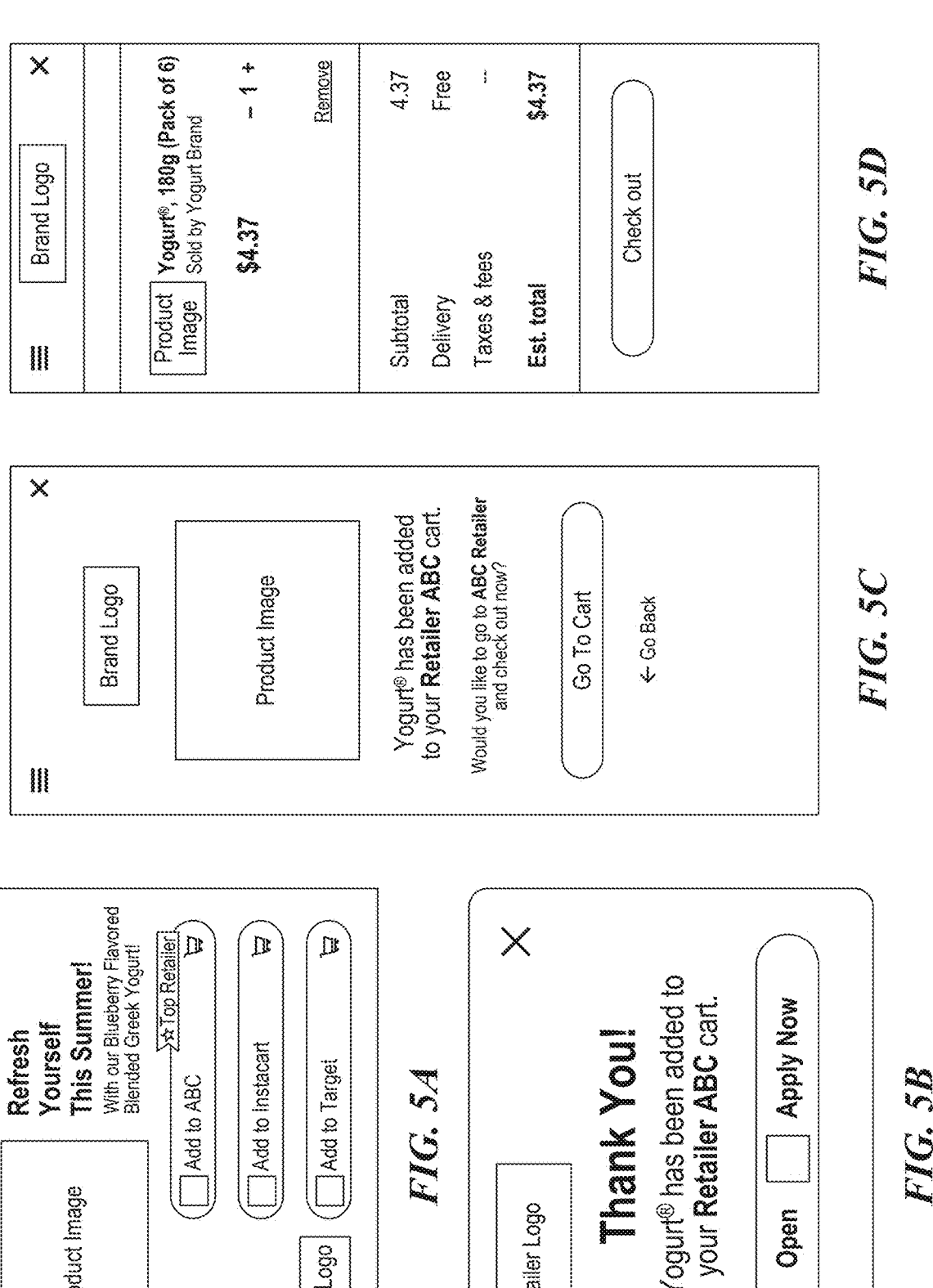
FIGS. 5A-5D show a series of screenshots that each depict a display on a digital device during the stages of customer interaction with an advertisement, retailer selection, and order processing according to an embodiment of the invention.

FIGS. 5A-5D show a series of screenshots that each depict a display on a digital device during the stages of customer interaction with an advertisement, retailer selection, and order processing according to an embodiment of the invention. In FIG. 5A, a consumer is presented with an advertisement on a consumer device. The advertisement links to several retailers' shopping carts that are presented to the consumer. In the example of FIG. 5B, the consumer has selected ABC Store and is presented with a message confirming that the product has been saved to their cart. When the consumer adds the product to the ABC shopping cart an order is created and presented to the consumer that offers the consumer the option to checkout as shown in FIG. 5C. In FIG. 5D, if the consumer decides to complete the purchase by checking out the consumer is presented with a sign in screen for the retailer, in this case ABC Store.

Figure 6:
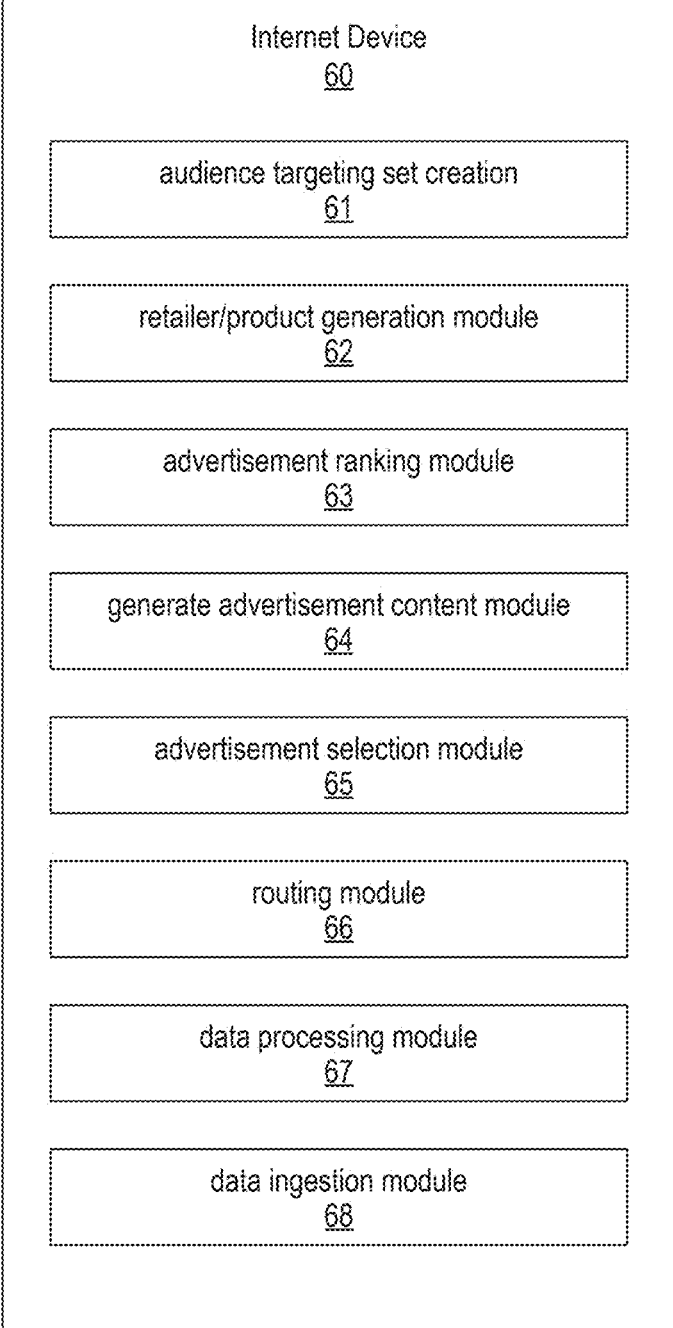
FIG. 6 shows a process flow according to an embodiment of the invention.

FIG. 6 shows a process flow according to an embodiment of the invention. In FIG. 6, an Internet device 60 includes an audience targeting set creation module. Once targeting is created, retailer and product information is determined by a retailer/product generation module 62. Thereafter, advertisements are ranked by an advertisement ranking module 63 and advertisement content is generated by an advertisement content module 64. Advertisements are selected by an advertisement selection module 65 and routed to a consumer digital device by a routing module 66. Processing on the Internet device is accomplished by a processing module 67 in conjunction with a data ingestion module 68.

Figure 7:
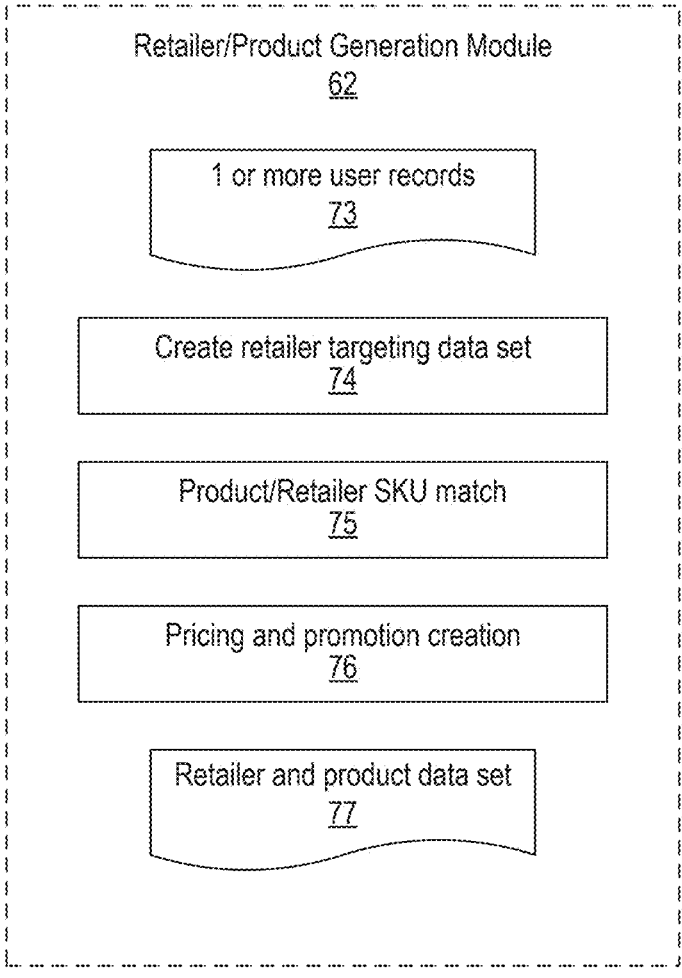
FIG. 7 shows a retailer/product generation module according to an embodiment of the invention.

FIG. 7 shows a retailer/product generation module 62 according to an embodiment of the invention. In FIG. 7, the module receives one or more user records 73. The module creates a retailer targeting data set 74 and performs a product/retailer SKU match 75. In this way similar products are identifiable across multiple retailers. Pricing and promotion creation is performed 76 and a resulting retailer and product data set 77 is created.

Figure 8:
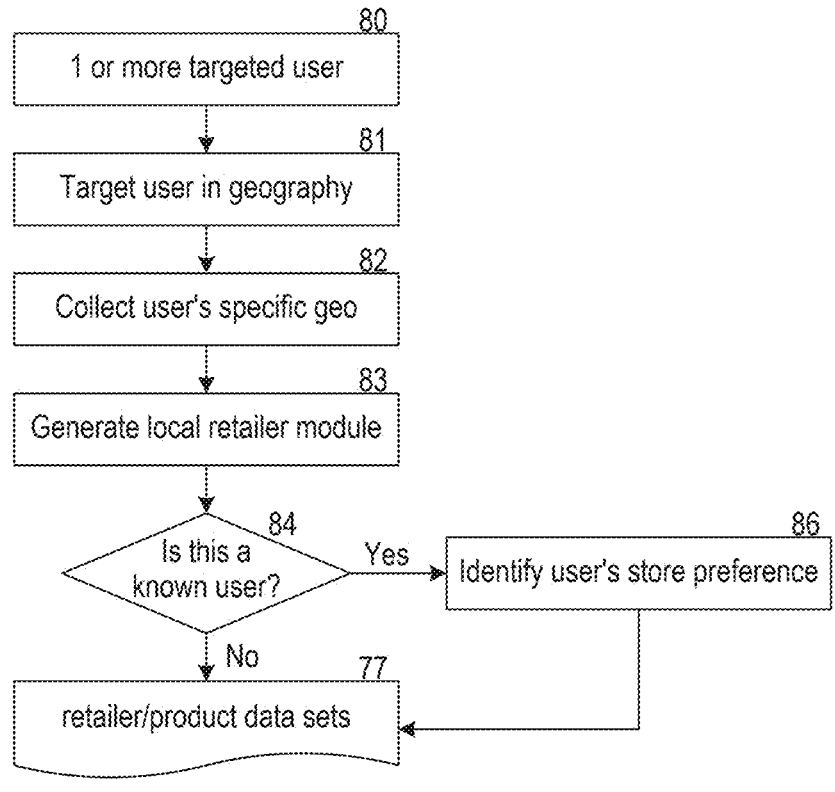
FIG. 8 shows retailer target data generation according to an embodiment of the invention.

FIG. 8 shows retailer target data generation according to an embodiment of the invention. In FIG. 8, one or more targeted users are identified 80. The user may be geographically targeted 81 and the user's specific geographic information is collected 82. Thereafter, a local retailer model is generated 83. The system determines if the user is a known user 84. If the user is known, the system identifies the user store preference 86; if the user is not known, the user is referred to the retailer/product data sets 77.

Figure 9:
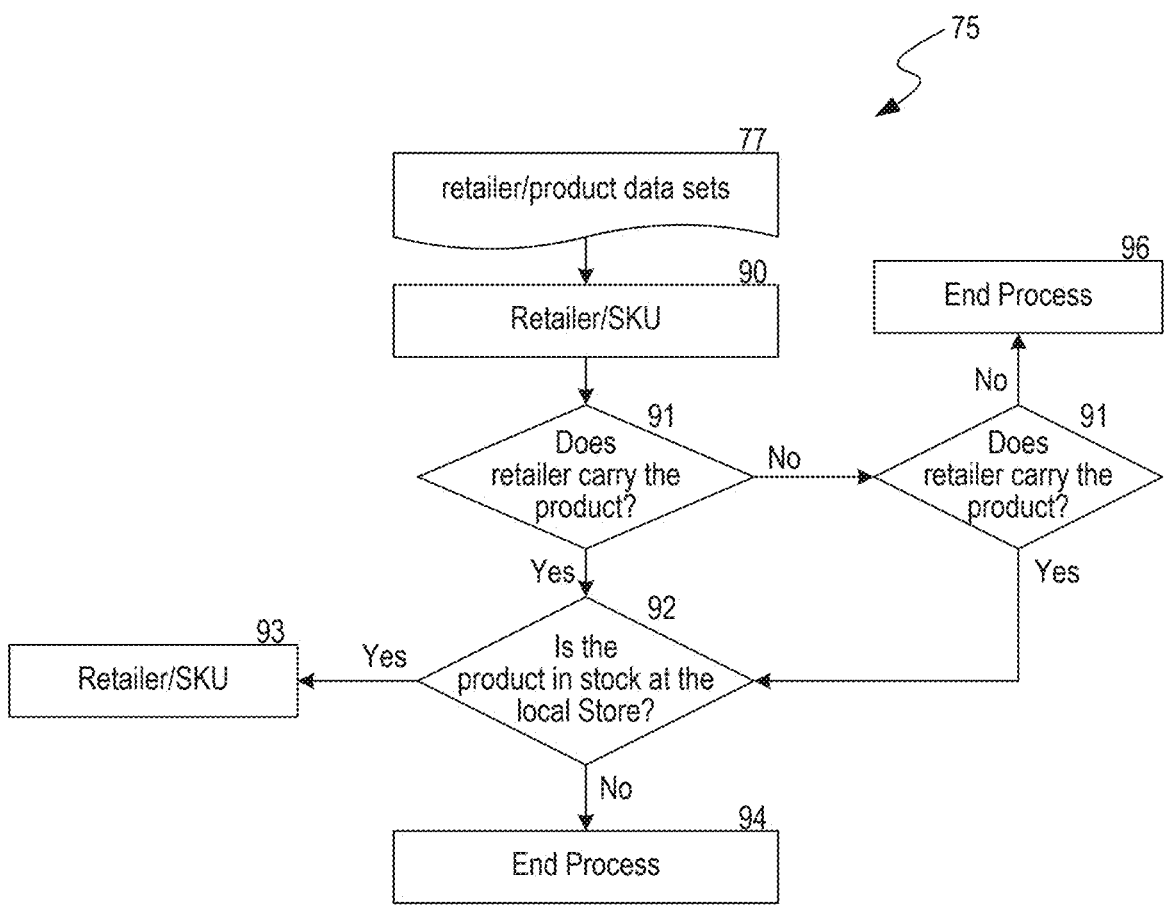
FIG. 9 shows a product/retailer SKU match module according to an embodiment of the invention.

FIG. 9 shows a product/retailer SKU match module according to an embodiment of the invention. In FIG. 9, beginning with the retailer/product data sets 77 the system applies the data to retailer/SKU information 90 to determine if the retailer carries the product in question 91. If the retailer does not carry the product in question the system determines if the brand has a secondary product 95. If the brand does have a secondary product the system determines if the product is in stock at a local store 92. If not the process ends 94; else, the system checks the retailer/SKU for addition to a shopping cart 93.

If the retailer does not carry the product in question and the brand does not have a secondary product, the process ends 96.

If the retailer does carry the product 91, the system determines if the product is in stock at a local store 92. If not the process ends 94; else, the system checks the retailer/SKU for addition to a shopping cart 93.

Figure 10:
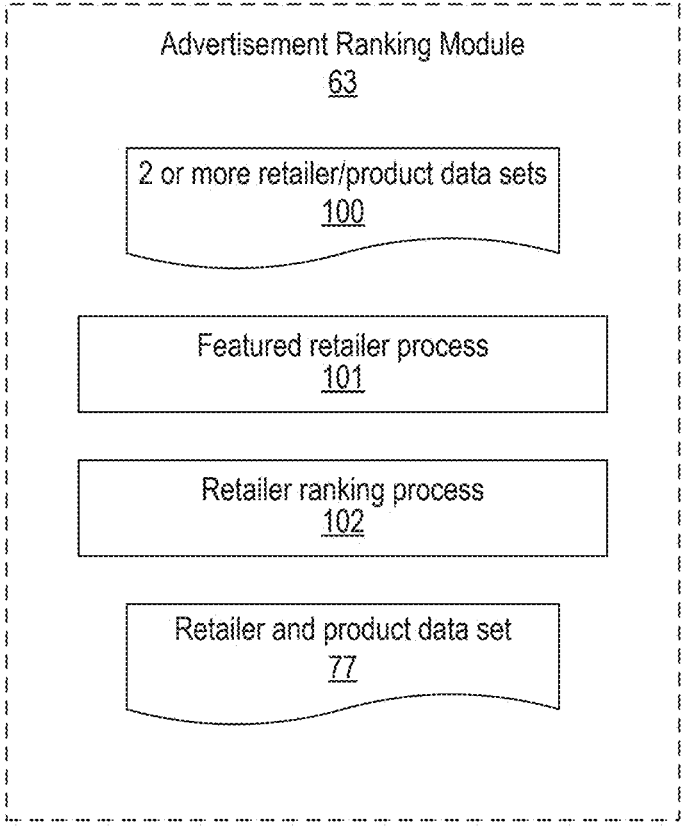
FIG. 10 shows an advertisement module according to an embodiment of the invention.

FIG. 10 shows an advertisement module according to an embodiment of the invention. In FIG. 10, the advertisement ranking module 63 operates on two or more retailer/product data sets 100. The system applies a featured retailer process 101 to promote retailers as determined. Thereafter, the retailer ranking process is applied 102 and a resulting retailer and product data set 77 is produced.

FIG. 11 shows a featured retailer process 101 according to an embodiment of the invention. In FIG. 11, the featured retailer process operates on two or more retailer/product data sets 110. The system determines if there is a real time auction 111. If there is a real time auction the system runs the auction process 114 and provides auction results to set the featured retailer 112. If there is not a real time auction the system sets the featured retailer 112. Thereafter, the system updates the retailer/product data sets 77.

Figure 12:
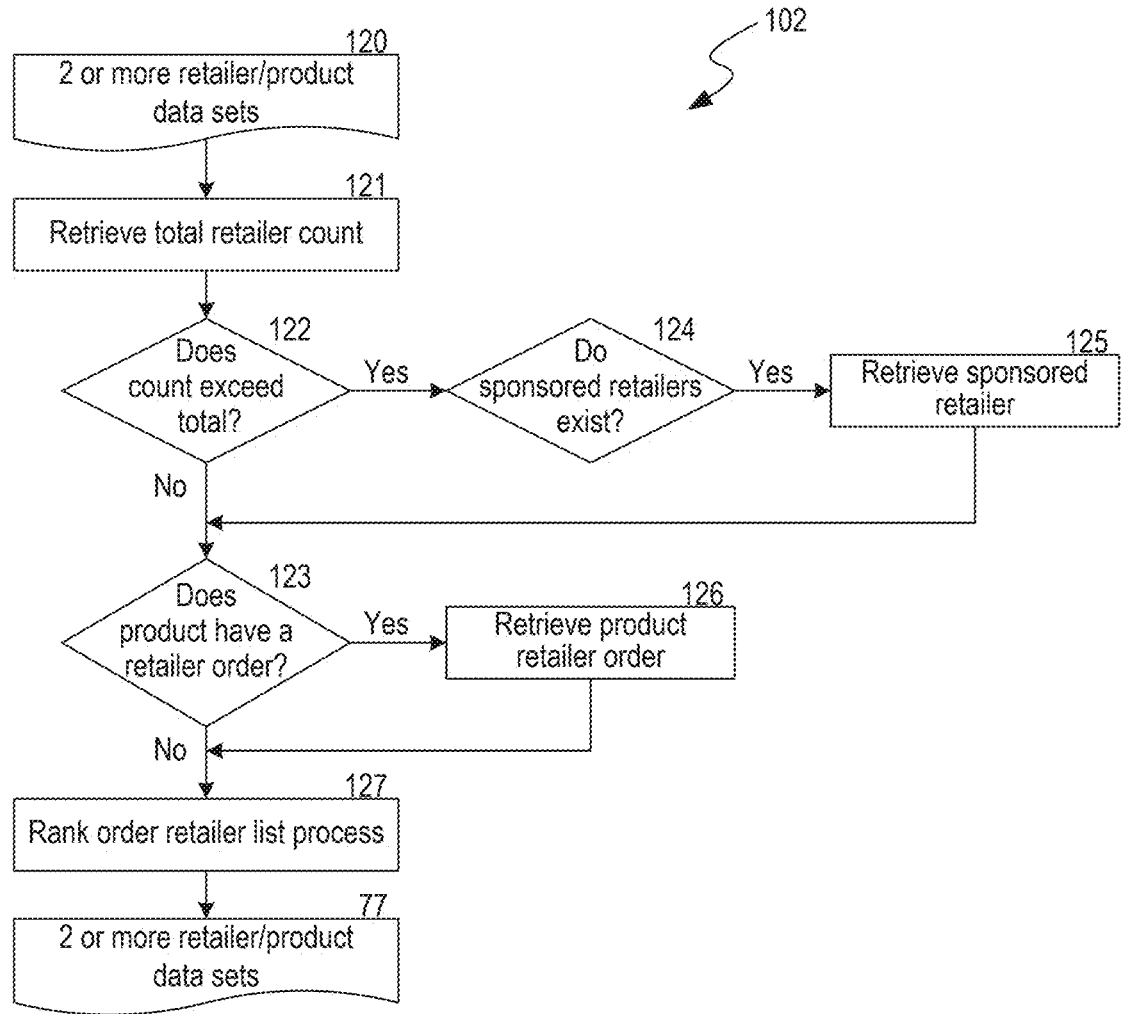
FIG. 12 shows a retailer ranking process according to an embodiment of the invention.

FIG. 12 shows a retailer ranking process 102 according to an embodiment of the invention. In FIG. 12, the retailer ranking process operates on two or more retailer/product data sets 120. The total retailer count is retrieved 121 and it is determined if the count exceeds a threshold total 122. If the count does exceed the total the system determines if sponsored retailers exist 124. If such retailer do exist the system retrieves the sponsored retailer 125 and then determines if the product has a list 123.

Similarly, if the count is not exceeded the system determines if the product has a list 123. If the product does not have a list the system rank orders the retailer list process 127 resulting in two of more retailer/product data sets 77.

If the product has a list the system retrieves a product retailer order 126 and rank orders the retailer list process 127 resulting in two of more retailer/product data sets 77.

Figure 13:
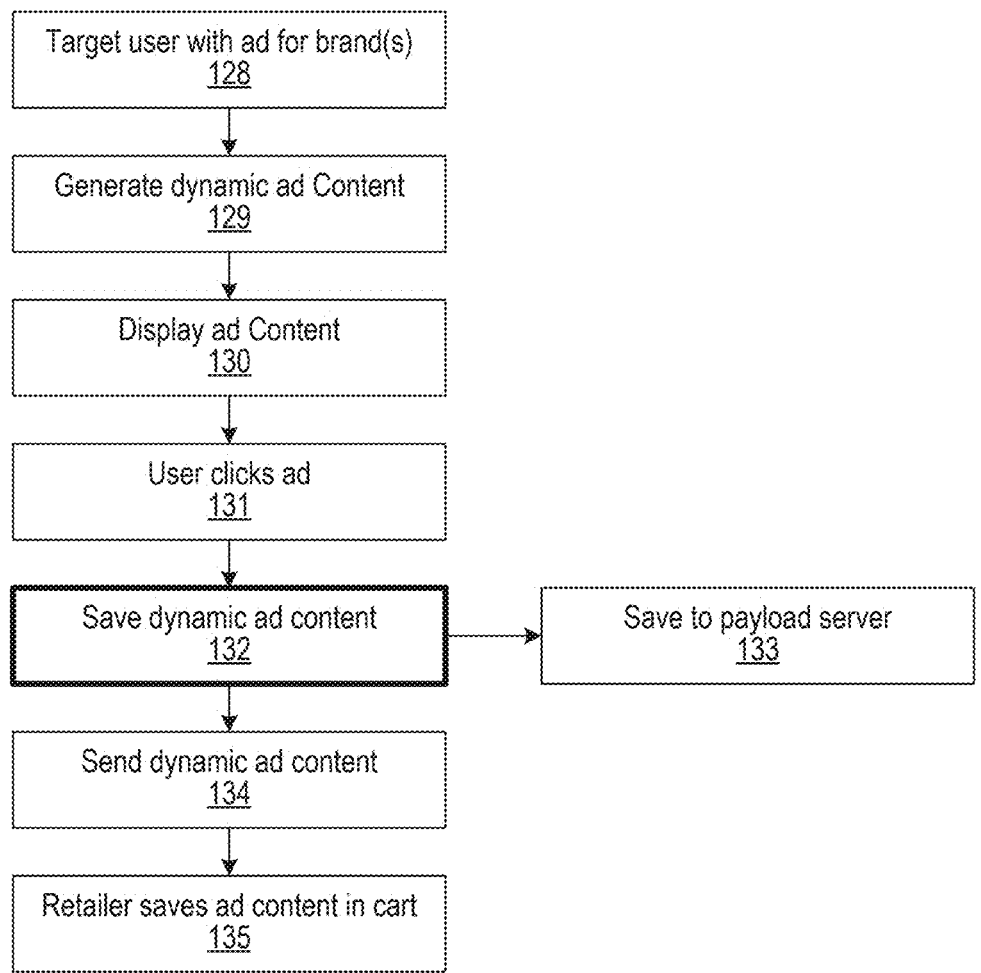
FIG. 13 is a flow diagram that shows the generation of a dynamic ad and of a multi-retailer cart according to an embodiment of the invention.

FIG. 13 is a flow diagram that shows the generation of a dynamic ad and of a multi-retailer cart according to an embodiment of the invention. In FIG. 13, a consumer is targeted for an ad 128, in this example for a specific brand. The system generates dynamic ad content 129 which is displayed to the consumer 130 on the consumer's device. In embodiment of the invention the ad content is linked with two or more retailers and links to each of the retailers are displayed with the ad content.

The ad itself is created through the generate advertisement content module 64 (see FIG. 6). Prior to this, data is gathered by the audience targeting set creation module 61, retailer/product generation module 62, and the advertisement ranking module 63, and then passed to generate advertisement content module 64 to create the ad with the retailers that the shopper would see.

In embodiments, the retailer links are Web redirect links that are processed through a Web browser. In other embodiments, a custom data set is sent directly to a retailer or a payload service is used (U.S. Pat. No. 10,692,129, supra). If the consumer selects one of the retailers associated with the advertisement 131, dynamic content is saved 132 and passed to a payload server 133. The dynamic ad content is also sent to the selected retailer 134 and the retailer saves the content in the retailer's shopping cart 135. The processes that companies use are basic. Embodiments of the invention either send a custom data set directly to a retailer or use a payload service (U.S. Pat. No. 10,692,129, supra).

Figure 14:
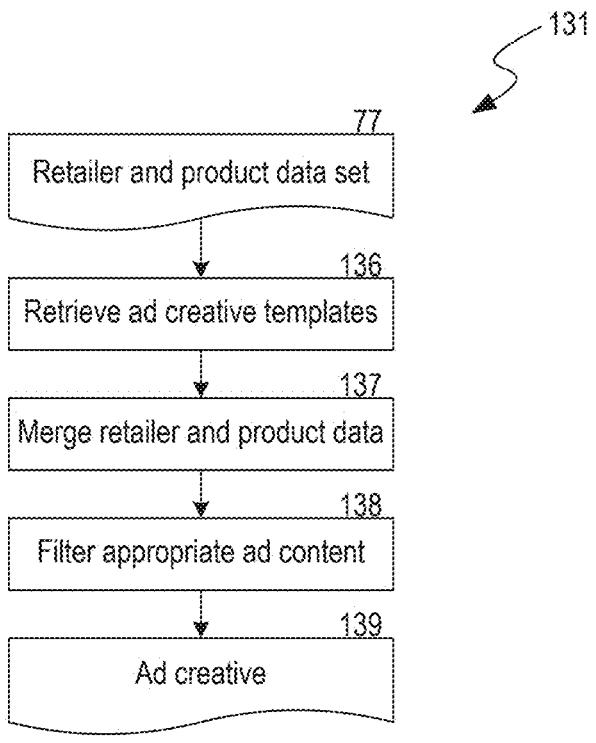
FIG. 14 is a flow diagram that shows the generation of a dynamic ad creative according to an embodiment of the invention.

FIG. 14 is a flow diagram that shows the generation of a dynamic ad creative according to an embodiment of the invention. In FIG. 14, the retailer and product data set 77 is accessed. Ad creative templates are retrieved 136 and the retailer and product data are merged 137. The data is then filtered for appropriate ad content 138 and the ad creative is produced 139.

Figure 15:
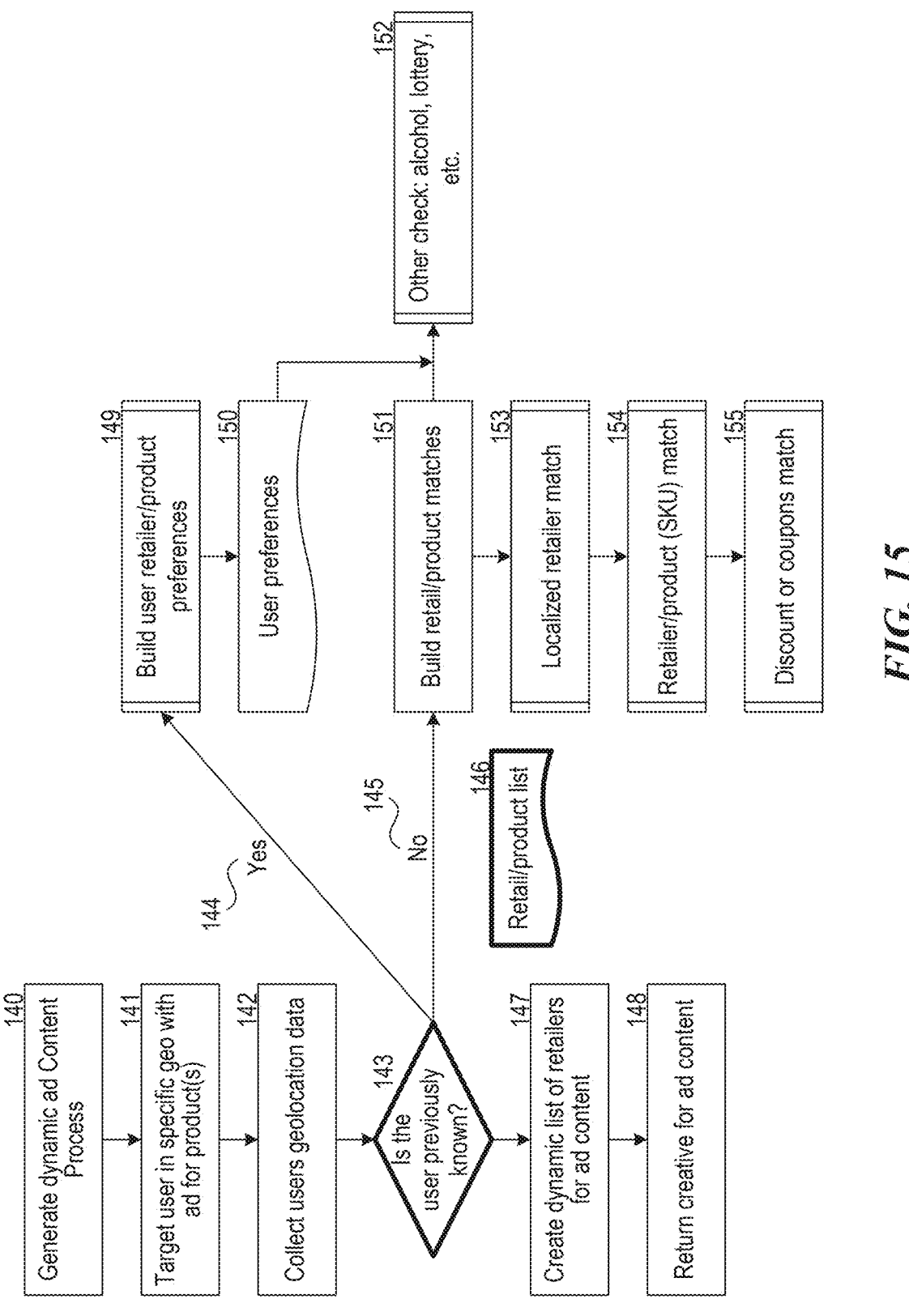
FIG. 15 is a flow diagram that shows a detailed sequence for the generation of a multi-retailer cart according to an embodiment of the invention.

FIG. 15 is a flow diagram that shows a detailed sequence for the generation of a multi-retailer cart according to an embodiment of the invention. In FIG. 15, the dynamic ad generation process proceeds 140 as in FIG. 13 above. In embodiments of the invention, the consumer is targeted 141 with specific advertisements based on the consumer's location. The advertisements include such location-related information as a list of two more retailers that are proximate to the consumer, local offers for products, nearest retailers having the advertised product in stock, etc. Accordingly, the system collects the consumer's geolocation information 142 and applies this information when generating dynamic ad content.

The system also determines if the user is previously known 143. If the consumer is previously known 144, the system builds a dynamic ad from a retailer and product list 146 based on user retailer and product preferences 149 and other user preferences 150. The system then checks for other qualifications or limitations 152, such as for alcohol purchases, lottery purchases, and the like.

If the consumer is not previously known 145, the system builds a list of retailer and product matches from a retailer and product list 146 to create the dynamic ad 151. The system then checks for other qualifications or limitations from a retailer and product list 146 and 152, such as for alcohol purchases, lottery purchases, and the like.

Whether the consumer is previously known or is not previously known the system performs a localized retailer match 153, a retailer/product (SKU) match 154, and a discount or coupons match 155.

Thereafter, the system creates a dynamic list of retailers for ad content 147 and returns a creative for ad content 148.

Figure 16:
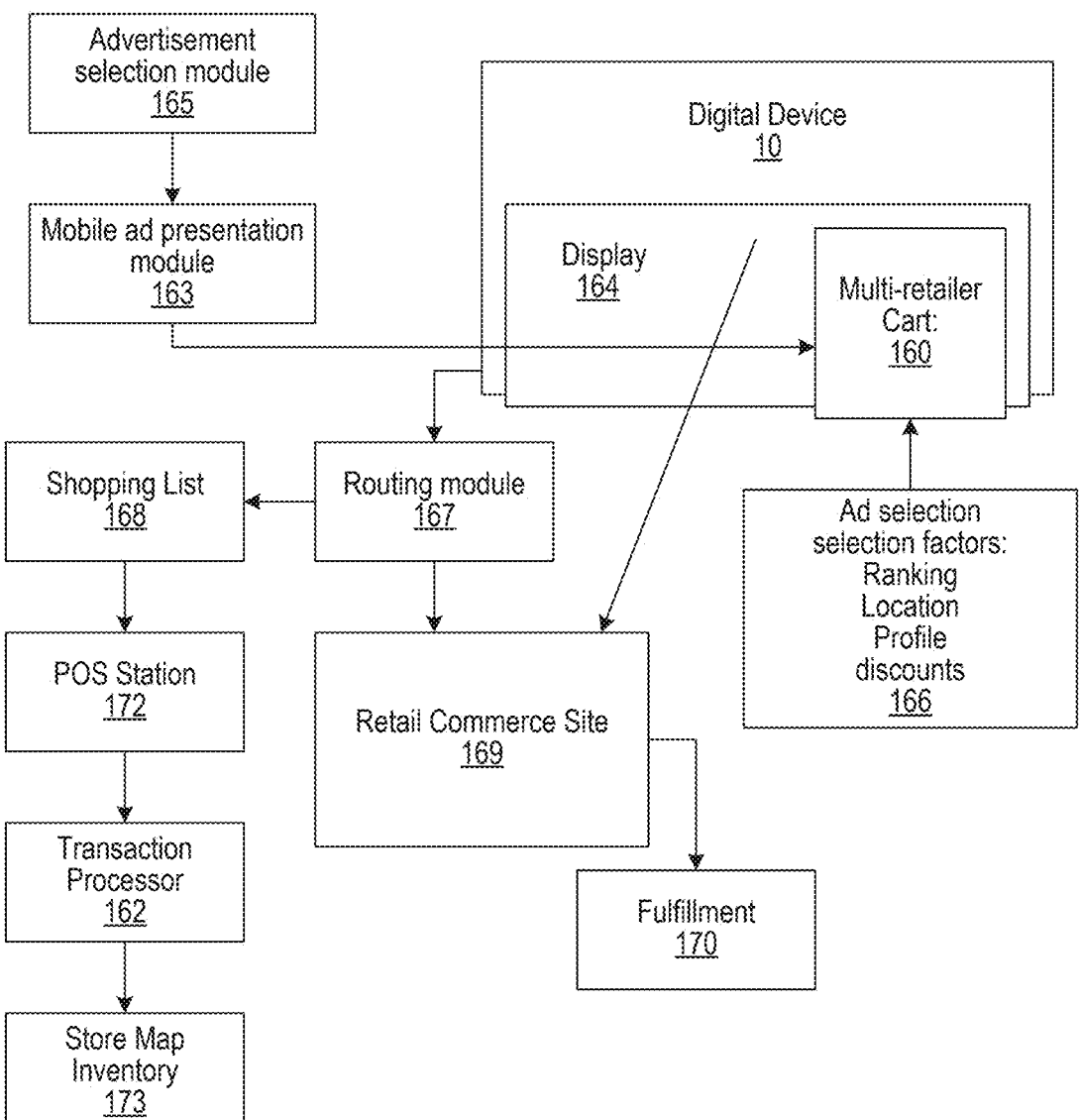
FIG. 16 is a block schematic diagram of a multi-retailer cart system showing according to an embodiment of the invention.

FIG. 16 is a block schematic diagram of a multi-retailer cart system showing according to an embodiment of the invention. In FIG. 16, in one or more implementations of the technology, at least a portion of the method may be performed by a computing device that includes at least one processor. The method may include presenting an electronic advertisement associated with a product, for display on any digital device 10, such as a mobile device, desktop computer, smart TV, etc. The method also may include the digital device for receiving an input indicating a selection of the advertisement. In embodiments of the invention when a consumer clicks the ad, a payload is created (see U.S. Pat. No. 10,692,129, supra) that is either routed directly to the multi-retailer cart 160 or to an in-store or e-comm cart at a later point. In the latter case the payload adds the selected item to the cart at that time.

A product offered by the advertisement selected by the consumer is displayed to the consumer in the multi-retailer cart 160 which allows the consumer to select the product from among a plurality of retailers identified in the multi-retailer cart that offer the same or similar products and the mobile. Upon selection of a retailer, the device optionally routes an application ("app") on the digital device to a retailer commerce site 169 or transaction processor 162.

In one or more implementations of the technology, a system may include a mobile advertisement presentation module 163, stored in memory, that provides a mobile advertisement, that advertises a product, for display 164 on a digital device. The system may also include an advertisement selection module 165, stored in memory, that detects when an advertisement has been selected for viewing.

A product offered by the advertisement is displayed to the consumer in the multi-retailer cart which allows the consumer to select the product from among a plurality of retailers identified in the multi-retailer cart that offer the same or similar products. The plurality of retailers to be displayed in the multi-retailer cart is determined by application of any of several factors 166 that include the current location of the consumer, where those retailers that are most proximate to the consumer are displayed; incentives that are uniquely available based on consumer location; profile information associated with the consumer, such as retail preferences, affinity memberships; retailer factors, such as the availability of discounts, coupons, availability of the product in inventory, etc. The retailers may be ranked in the cart based on any one or more of these factors, and/or based upon payment of a promotion fee.

Upon selection of a retailer, a routing module 167, stored in memory, routes a browser located on the digital device to a shopping list 168 and/or to a retailer commerce site order entry system 169. The retailer order entry system may also enter discounts, coupons, or other promotions associated with the selected product that are offered by the retailer and/or that are available to the consumer by virtue of the consumer's profile and/or affinity status with the retailer. Incentives that are uniquely available based on consumer location may also be captured even where the incentives for the advertised product are only available locally and not otherwise available nationally.

The retailer then fulfills the order 170. In embodiments, fulfillment can occur via an on-line fulfillment mechanism. In other embodiments, the consumer can select the product from an advertisement while in a brick-and-mortar store and complete the order at a POS 172 station within the store that is then executed in a transaction processor 162. In still other embodiments, the system receives POS data tied to the consumer and uses that data to enhance the ad targeting process.

A shopping list may then be configured to open when the consumer enters or comes within a defined proximity of an advertised store or enters or comes within a defined proximity of a store which carries the product or service or when the consumer manually selects to open the shopping list. The shopping list may be linked with a store map 173 which provides the location of the product/service within the store and once the product/service is purchased, the product/service may automatically be removed from the list or it may need to be manually removed from the list.

Computer Implementation

Figure 17:
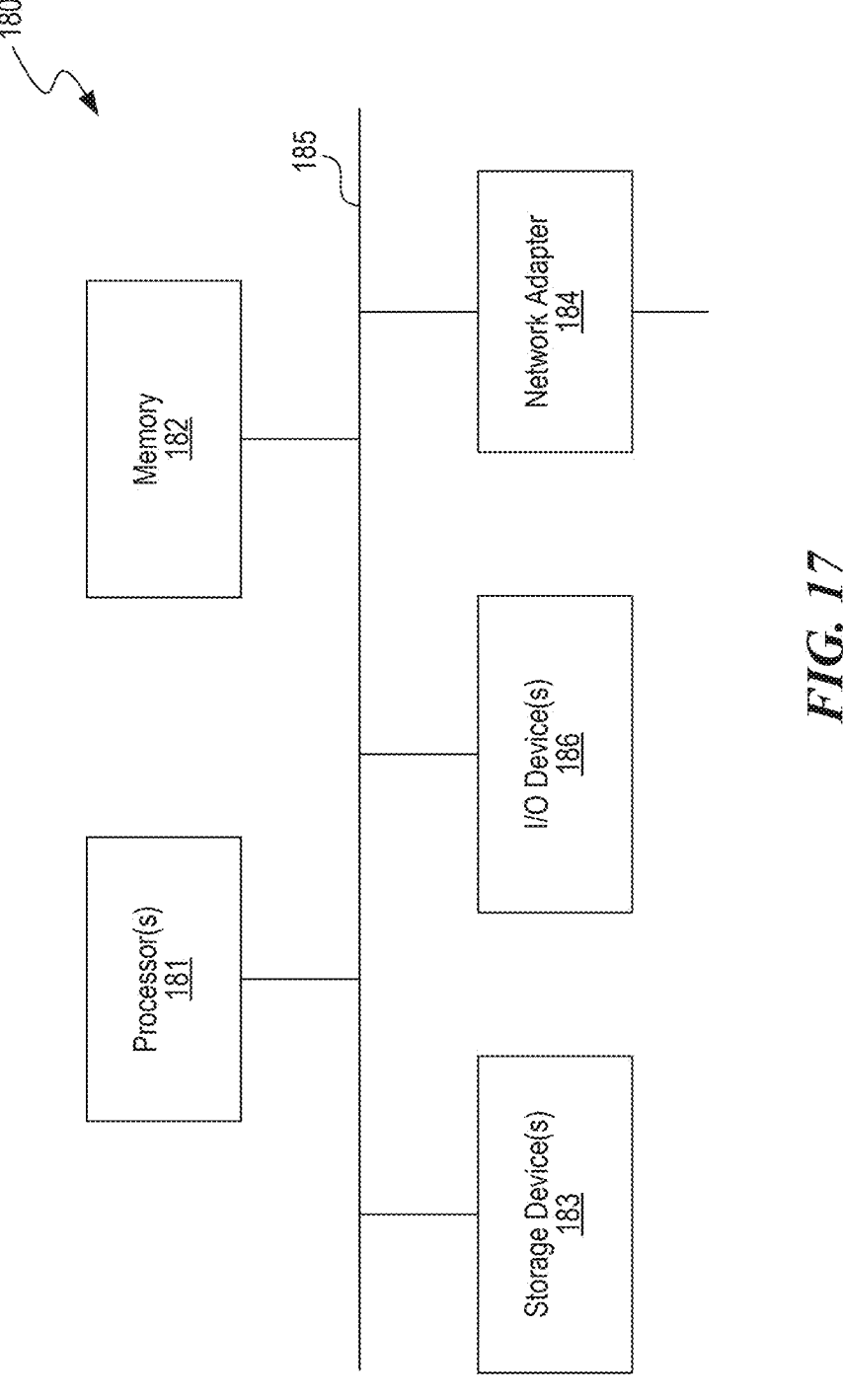
FIG. 17 is a block diagram of a computer system as may be used to implement certain features of some of the embodiments.

FIG. 17 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 180 may include one or more central processing units ("processors") 181, memory 182, input/output devices 186, e.g. keyboard and pointing devices, touch devices, display devices, storage devices 183, e.g. disk drives, and network adapters 184, e.g. network interfaces, that are connected to an interconnect 185. The interconnect 185 is illustrated as an abstraction that represents any one or more separate physical buses, point to point connections, or both connected by appropriate bridges, adapters, or controllers. The interconnect 185, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called Firewire.

The memory 182 and storage devices 183 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 182 can be implemented as software and/or firmware to program the processor 181 to carry out actions described above. In some embodiments, such software or firmware may be initially provided to the processing system 180 by downloading it from a remote system through the computing system 180, e.g. via network adapter 184.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method, comprising:
a computing device comprising at least one processor and a memory sending a dynamic advertisement comprising a personalized targeted advertisement to a consumer for display on a digital device;
said computing device customizing the targeted advertisement based on a dynamically updated consumer profile derived by said computing device from behavioral analysis, real-time activity tracking, and/or predictive analytics, the targeted advertisement offering a specific product associated with a particular brand in response to consumer interactions with the digital device received by the computing device from the digital device;
said computing device querying a plurality of retailer data sources to identify a contextually relevant plurality of retailers that offer the product shown in the advertisement;
said computing device applying weighted ranking criteria to said plurality of retailers to prioritize any of consumer preferences, geographic proximity, stock availability, and promotional offers;
said computing device using said weighted ranking criteria to retrieve and aggregate data from disparate retailer user interfaces (UIs) and application programming interfaces (APIs) to assemble a retailer list;
said computing device generating for display on the digital device a harmonized and adaptive multi-retailer interactive interface with which the assembled retailer list is presented to the consumer on the digital device to display product comparison information to the consumer for purchase decision-making;
said computing device linking the targeted advertisement with each of the identified plurality of retailers;
said computing device dynamically generating retailer-specific purchase pathways, said retailer-specific purchase pathways integrating with disparate retailer commerce infrastructures to provide a unified user interface via said interactive interface;
said computing device generating a real-time synchronized multi-retailer cart for display on said digital device, said multi-retailer cart displaying the product shown in the advertisement along with a dynamically updated list of the identified plurality of retailers;
said computing device via the multi-retailer cart:
visually represents pricing, availability, and promotional incentives from each retailer,
includes real-time stock validation, and
provides a single-click purchase mechanism;
said computing device receiving an input from the digital device indicating the consumer's selection of a specific retailer from the multi-retailer cart; and
upon receiving selection of a retailer by the consumer, said computing device executing at least one of the following actions:
saving the product into a persistent, cross-platform shopping list or digital cart that synchronizes across multiple consumer devices,
initiating an automated checkout process via an integrated retailer commerce site or transaction processor, and
triggering a real-time digital purchase assistant that provides the consumer with alternative buying options, discount recommendations, or loyalty rewards before finalizing the transaction.

2. The method of claim 1, further comprising:
with an advertisement presentation module providing an advertisement that advertises a product for display on the digital device.

3. The method of claim 1, further comprising:
with an advertisement selection module detecting when an advertisement has been selected by the consumer for viewing.

4. The method of claim 1, further comprising:
ranking the retailers in the multi-retailer cart based application of one or more factors comprising any of:
a current location of the consumer, where those retailers that are most proximate to the consumer are displayed;
incentives that are uniquely available based on consumer location;
profile information associated with the consumer, including any of retail preferences and affinity memberships;
retailer factors, including any of availability of discounts, coupons, and availability of the product shown in the advertisement selected by the consumer in inventory; and/or
based upon payment of a promotion fee.

5. The method of claim 1, further comprising:

upon selection of a retailer by the consumer, a routing module routing a browser located on the digital device to a shopping list and/or to a retailer order entry system.

6. The method of claim 5, further comprising:

the retailer order entry system entering discounts, coupons, or other promotions associated with the product in question that are offered by the retailer and/or that are available to the consumer by virtue of the consumer's profile, affinity status of the consumer with the retailer, and/or based on consumer location where the incentives for the product shown in the advertisement selected by the consumer are only available locally and not otherwise available nationally.

7. The method of claim 1, further comprising:

the retailer completing the transaction to fulfill an order via an on-line fulfillment mechanism.

8. The method of claim 1, further comprising:

the consumer selecting product shown in the advertisement selected by the consumer from an advertisement while in a brick-and-mortar store; and said consumer completing the order at a point of sale (POS) station within the store.

9. The method of claim 8, further comprising:

receiving POS data tied to the consumer; and using said received data to enhance an ad targeting process.

10. The method of claim 1, further comprising:

configuring a shopping list to open when the consumer enters or comes within a defined proximity of an advertised store or enters or comes within a defined proximity of a store which carries the product shown in the advertisement selected by the consumer or when the consumer manually selects to open the shopping list.

11. The method of claim 10, further comprising:

linking the shopping list with a store map which provides a location of the product shown in the advertisement selected by the consumer within the store.

12. The methods of claim 11, further comprising:

once the product shown in the advertisement selected by the consumer is purchased, automatically removing the product shown in the advertisement selected by the consumer from the list.

*   *   *   *   *